United States Patent
Tseng et al.

(10) Patent No.: US 8,346,689 B2
(45) Date of Patent: Jan. 1, 2013

(54) RECOMMENDATION SYSTEM USING ROUGH-SET AND MULTIPLE FEATURES MINING INTEGRALLY AND METHOD THEREOF

(75) Inventors: Shin-Mu Tseng, Tainan (TW); Ja-Hwung Su, Tainan (TW); Chin-Yuan Hsaio, Tainan (TW)

(73) Assignee: National Cheng Kung University, Tainan (TW)

( * ) Notice: Subject to any disclaimer, the term of this patent is extended or adjusted under 35 U.S.C. 154(b) by 521 days.

(21) Appl. No.: 12/690,976

(22) Filed: Jan. 21, 2010

(65) Prior Publication Data

US 2011/0178964 A1 Jul. 21, 2011

(51) Int. Cl.
*G06F 15/18* (2006.01)
*G06F 17/00* (2006.01)
*G06F 7/00* (2006.01)

(52) U.S. Cl. .............. 706/12; 706/45; 707/705
(58) Field of Classification Search .............. None
See application file for complete search history.

(56) References Cited

U.S. PATENT DOCUMENTS 8,086,555 B2 * 12/2011 Pan et al. .............. 706/52
2006/0041548 A1 * 2/2006 Parsons et al. .............. 707/5

* cited by examiner

*Primary Examiner* — Alan Chen
(74) *Attorney, Agent, or Firm* — Jackson IPG PLLC

(57) ABSTRACT

The present invention solves problems of cold start, first rater, sparsity and scalability for recommendation. A recommendation system according to the present invention finds association rules through data mining. Then, the recommendation system integrates a rough-set algorithm and a statistical analysis prediction for recommendation. The recommendation is dynamically made from a result of the rough-set algorithm and a result of the statistical analysis prediction by setting a standard deviation as a threshold.

9 Claims, 13 Drawing Sheets

| Movie ID | $C_1$ | $C_2$ | $C_3$ | $C_4$ |
|---|---|---|---|---|
| $I_1$ | 1 | 0 | 1 | 1 |
| $I_2$ | 1 | 0 | 0 | 1 |
| $I_3$ | 0 | 1 | 1 | 0 |
| $I_4$ | 1 | 0 | 1 | 1 |

FIG.5

| transaction ID | user | item | value |
|---|---|---|---|
| 100 | $U_1$ | 1 | 3 |
| 200 | $U_1$ | 4 | 5 |
| 300 | $U_2$ | 1 | 2 |
| 400 | $U_3$ | 1 | 2 |
| 500 | $U_3$ | 3 | 5 |

FIG.6

| virtual category | category combination | movie ID |
|---|---|---|
| A | $C_1+C_3+C_4$ | $I_1, I_4$ |
| B | $C_1+C_4$ | $I_2$ |
| C | $C_2+C_3$ | $I_3$ |

FIG.7

| User \ Vir. Cat. | A | B | C |
|---|---|---|---|
| $U_1$ | 4 | 0 | 0 |
| $U_2$ | 2 | 0 | 0 |
| $U_3$ | 2 | 0 | 5 |

FIG.8

|    | $U_1$ | $U_2$ | $U_3$ | $U_4$ | $U_5$ | $U_6$ | $U_7$ | $U_8$ | $U_9$ | $U_{10}$ |
|----|----|----|----|----|----|----|----|----|----|----|
| $I_1$ | 4 | 4 | 5 | 2 | 4 | 0 | 3 | 1 | 4 | 0 |
| $I_2$ | 1 | 4 | 5 | 1 | 4 | 3 | 4 | 1 | 0 | 5 |
| $I_3$ | 3 | 3 | 0 | 3 | 2 | 1 | 2 | 0 | 3 | 3 |
| $I_4$ | 2 | 1 | 1 | 0 | 2 | 0 | 2 | 1 | 1 | 1 |
| $I_5$ | 2 | 1 | 1 | 2 | 2 | 1 | 2 | 1 | 1 | 0 |

FIG.9a

|   | $U_1$ | $U_2$ | $U_3$ | $U_4$ | $U_5$ | $U_6$ | $U_7$ | $U_8$ | $U_9$ | $U_{10}$ |
|---|---|---|---|---|---|---|---|---|---|---|
| $I_1$ | 4 | 4 | 5 | 2 | 4 | 3 | 3 | 1 | 4 | 4 |
| $I_2$ | 1 | 4 | 5 | 1 | 4 | 3 | 4 | 1 | 4 | 5 |
| $I_3$ | 3 | 3 | 1 | 3 | 2 | 1 | 2 | 1 | 3 | 3 |
| $I_4$ | 2 | 1 | 1 | 2 | 2 | 1 | 2 | 1 | 1 | 1 |
| $I_5$ | 2 | 1 | 1 | 2 | 2 | 1 | 2 | 1 | 1 | 1 |

FIG.9b

| elementary set | user ID | class item $I_1$ |
|---|---|---|
| 1 | $U_1$ | 4 |
|  | $U_2$ |  |
|  | $U_5$ |  |
|  | $U_9$ |  |
|  | $U_{10}$ |  |
| 2 | $U_8$ | 1 |
| 3 | $U_4$ | 2 |
| 4 | $U_6$ | 3 |
|  | $U_7$ |  |
| 5 | $U_3$ | 5 |

FIG.10

| elementary set | user ID | target item $I_2$ | referred item $I_3$ |
|---|---|---|---|
| 1 | $U_8$ | 1 | 1 |
| 2 | $U_4$ | 1 | 3 |
| 3 | $U_6$ | 3 | 1 |
| 4 | $U_5$ | 4 | 2 |
|   | $U_7$ |   |   |
| 5 | $U_2$ | 4 | 3 |
|   | $U_9$ |   |   |
| 6 | $U_3$ | 5 | 1 |
| 7 | $U_{10}$ | 5 | 3 |

FIG.11

| Movie ID | $C_1$ | $C_2$ | $C_3$ | $C_4$ |
|---|---|---|---|---|
| $I_1$ | 1 | 0 | 1 | 1 |
| $I_2$ | 1 | 0 | 0 | 1 |
| $I_3$ | 0 | 1 | 1 | 0 |
| $I_4$ | 1 | 0 | 1 | 1 |
| $I_x$ | 1 | 0 | 1 | 1 |

FIG.12

RECOMMENDATION SYSTEM USING ROUGH-SET AND MULTIPLE FEATURES MINING INTEGRALLY AND METHOD THEREOF

FIELD OF THE INVENTION

The present invention relates to a recommendation system; more particularly, relates to finding association rules through data mining and integrating a rough-set algorithm and a statistical analysis prediction.

DESCRIPTION OF THE RELATED ART

A general recommendation method comprises the following two steps:

(A) Possible satisfactions of items for each user are analyzed for an untouched item, where a general value for the untouched item is "unknown value".

(B) Then, a result obtained after analyzing is sorted to find an item most interesting to a user for recommendation.

Recent researches mainly focus on enhancing the precision of the result obtained after step (A). Researches of the recommendation method are mainly focus on collaborative filtering. However, the collaborative filtering has the following problems:

(1) Cold start: When a general recommendation system faces a brand new user, no past transactions can be referred, so no similarities can be figured out for collaborative filtering or content-based filtering. Hence, no recommendation can be made to the user.

(2) First rater: Concerning a brand new item, no past transactions can be found either. Even though a nearest neighborhood to the user can be found through collaborative filtering, no calculations are possible owing to no transactions. Hence, no items will be recommended until some rating values are obtained from some users.

(3) Sparsity: In the collaborative filtering, because other users having similar rating behaviors to the user have to be found through calculating their similarities based on items rated by both the user and any other user. Yet, most users only rate a small part of a great sum of items. Hence, it is difficult to find items rated by both the user and another user; and, thus, similar users are difficult to be found either.

(4) Scalability: Following the increase in users, an area for searching most related users increases too; and, thus, performance of the collaborative filtering reduces as well.

Although collaborative filtering is on the hit, the above problems of cold start, first rater, sparsity and scalability still exist. Hence, the prior art does not fulfill all users' requests on actual use.

SUMMARY OF THE INVENTION

The main purpose of the present invention is to find association rules through data mining and integrate a rough-set algorithm and a statistical analysis prediction for recommendation.

The second purpose of the present invention is to find association rules through data mining for further solving problems of cold-start, first-rater and sparsity.

The third purpose of the present invention is to filter out other unrelated users through a clustering algorithm for a good scalability.

The fourth purpose of the present invention is to dynamically applying one of the two prediction methods through setting a threshold for effectively enhancing satisfaction of the prediction precision.

To achieve the above purposes, the present invention is a recommendation system using rough-set and multiple features mining integrally and a method thereof, where the recommendation system comprises a user-and-item module, a data integration module, an association mining module, a user clustering module, a statistical analysis prediction (SAP) module, a user-cluster selection module, a data matrix module, a rough-set prediction (RSP) module and a deviation decision module; the recommendation system comprises a training session and a prediction session; the training session builds association rules, user clusters and rating tables; the prediction session obtains a predicted rating value of a target item of a target user with the rating logs of users through a rough-set prediction and a statistical analysis prediction; the training session comprises steps of: (a) providing data including user profiles, user rating logs and item contents; (b) preprocessing said data to obtain a transaction table; (c) associating transactions in the transaction table to obtain a plurality of associations to further obtain a plurality of association rules through data mining to be saved in an association rule database; (d) obtaining the user rating logs to divide users into user clusters through a clustering algorithm to be saved in a user cluster database; and (e) analyzing the transactions in the transaction table to re-symbolize items into item categories through a statistical analysis and reorganizing user rating logs to obtain rating averages of the item categories and to further obtain a rating table of the re-symbolized item categories; and the prediction session comprises steps of: (f) finding a user cluster of related users to a target user from the user clusters to obtain a rating table of the related users and the target user; (g) based on the association rules, predicting unknown values in said rating table other than rating value of a target item of the target user to obtain a complete sub-matrix; (h) obtaining a class item, a referred item and a plurality of item sets in the sub-matrix, obtaining a plurality of first elementary sets by dividing the users with the class item, obtaining a plurality of second elementary sets by dividing the users with the item sets, and comparing the first elementary sets and the second elementary sets to obtain a lower approximation through a rough-set algorithm using a user cardinality constraint and an item cardinality constraint for further obtaining a predicted rating value of the target item of the target user; (i) obtaining another predicted rating value of the target item of the target user through a statistical analysis prediction based on the rating table of the item categories obtained in the training session; and (j) obtaining a final predicted rating value of the target item of the target user through a switch-based mixing; a first standard deviation is pre-set as a threshold; if a second standard deviation of past rating values of the same item category as that of the target item is bigger than the threshold, the predicted rating value obtained through the statistical analysis prediction is obtained as a final predicted rating value of the target item; and, if not, the predicted rating value obtained through the rough-set algorithm is obtained as the final predicted rating value. Accordingly, a novel recommendation system using rough-set and multiple features mining integrally and a method thereof are obtained.

BRIEF DESCRIPTION OF THE DRAWINGS

The present invention will be better understood from the following detailed description of the preferred embodiment according to the present invention, taken in conjunction with the accompanying drawings, in which

FIG. 5 is the first view showing the movie categories;

FIG. 6 is the first view showing the rating values of the movies;

FIG. 7 is the view showing the virtual categories;

FIG. 8 is the view showing the rating values of the virtual categories;

FIG. 9a is the second view showing the rating values of the movies;

FIG. 9b is the view showing the sub-matrix obtained through the association rules;

FIG. 10 is the view showing the first elementary sets;

FIG. 11 is the view showing the second elementary sets; and

FIG. 12 is the second view showing the movie categories.

DESCRIPTION OF THE PREFERRED EMBODIMENT

The following description of the preferred embodiment is provided to understand the features and the structures of the present invention.

Figure 1:
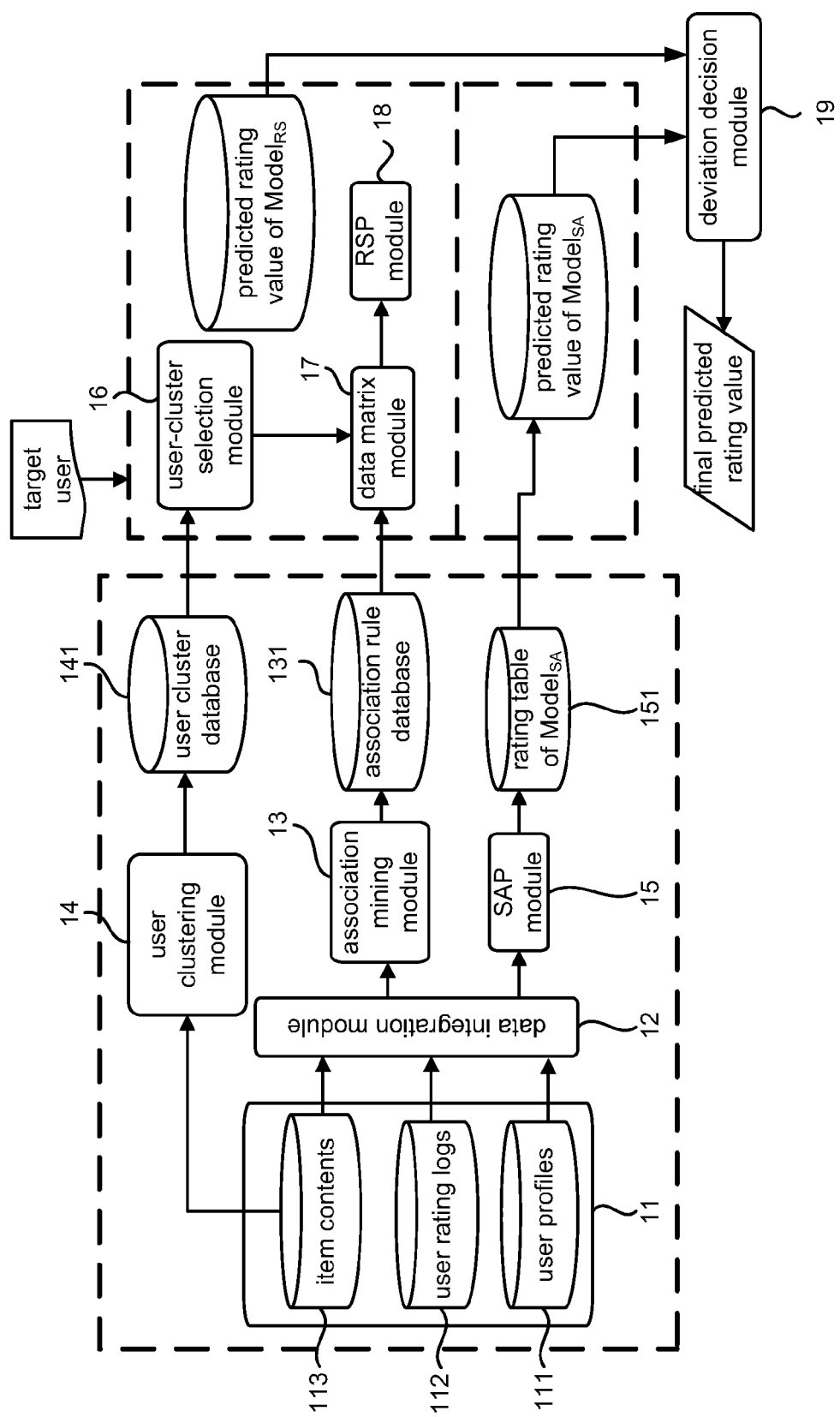
FIG. 1 is the structural view showing the recommendation system of the preferred embodiment according to the present invention.

Please refer to FIG. 1, which is a structural view showing a recommendation system of a preferred embodiment according to the present invention. As shown in the figure, the present invention is a recommendation system using rough-set and multiple features mining integrally and a method thereof. The recommendation system comprises a user-and-item module 11, a data integration module 12, an association mining module 13, a user clustering module 14, a statistical analysis prediction (SAP) module (Model$_{SA}$) 15, a user-cluster selection module 16, a data matrix module 17, a rough-set prediction (RSP) module (Model$_{RS}$) 18 and a deviation decision module 19.

The user-and-item module 11 provides user profiles 111, user rating logs 112 and item contents 113.

The data integration module 12 receives the user profiles 111, the user rating logs 112 and the item contents 113 from the user-and-item module 11 to be pre-processed for forming a transaction table by integrating the user rating logs 112 with the user profiles 111 and the item contents 113.

The association mining module 13 receives the transaction table from the data integration module 12 to fetch associations in the transaction table, where the associations are saved as association rules in an association rule database 131.

The user clustering module 14 receives the user rating logs 113 to divide users into user clusters; and the user clusters are saved in a user cluster database 141.

The SAP module 15 receives the transaction table to process a statistical analysis to each transaction in the transaction table to be summarized by category for building a rating table 151 of re-symbolized item categories; and predicted rating values of the item categories are obtained for each user according to the rating table.

The user-cluster selection module 16 obtains a user cluster of related users other than the target user from the user clusters in the user cluster database 141 based on rating logs of the target user; and obtains a rating table of all items of the target user and the related users.

The data matrix module 17 receives the rating table to predict unknown values of items other than that of the target item of the target user according to the association rules in the association rule database 131 to obtain a complete sub-matrix.

The RSP module 18 receives the sub-matrix to compare first elementary sets and second elementary sets to obtain a lower approximation for predicting a predicted rating value of the target item of the target user, where the first elementary sets are obtained through dividing the sub-matrix with a class item and the second elementary sets are obtained through dividing the sub-matrix by item sets.

The deviation decision module 19 receives the predicted rating values from the SAP module 15 and the RSP module 18 to dynamically obtain a final predicted rating value by presetting a threshold. With the above structure, a novel recommendation system using rough-set and multiple features mining integrally is obtained.

Figure 2:
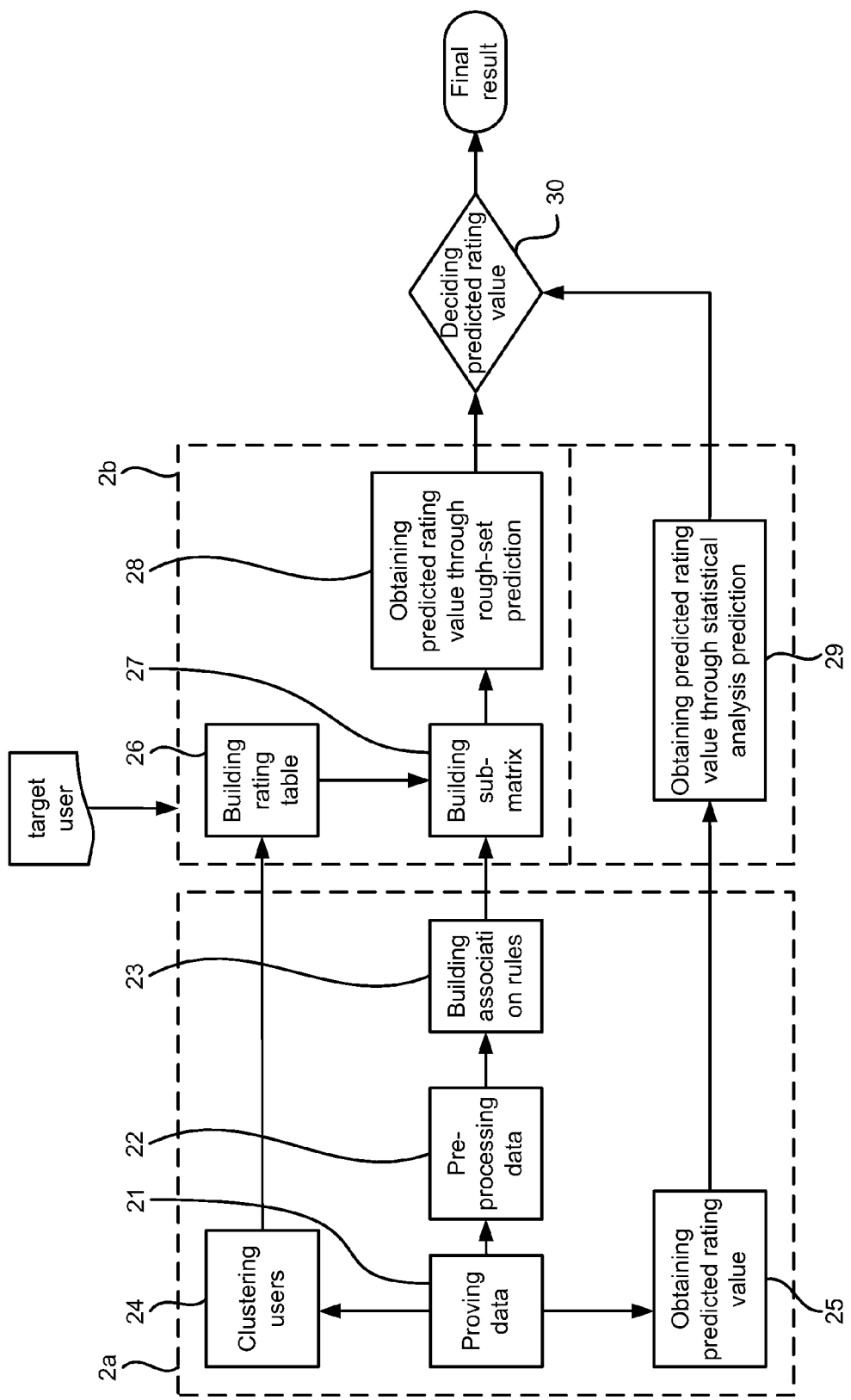
FIG. 2 is the flow view showing the recommendation method.

Please refer to FIG. 2, which is a flow view showing a recommendation method. As shown in the figure, a recommendation method according to the present invention comprises a training session 2a and a prediction session 2b. The training session 2a builds association rules, user clusters and rating tables, comprising the following steps:

(a) Proving data 21: Various data are provided, including user profiles, user rating logs and item contents.

(b) Pre-processing data 22: The data provided are pre-processed to form a transaction table.

(c) Building association rules 23: Transactions in the transaction table are associated to fetch associations for building a plurality of association rules through data mining; then the association rules are saved in an association rule database.

(d) Clustering users 24: The user rating logs are used to cluster users into user clusters through a clustering algorithm; and the user clusters are saved into a user cluster database.

(e) Obtaining predicted rating value 25: Each transaction in the transaction table is analyzed to re-symbolize items into item categories through a statistical analysis prediction; and the user rating logs are arranged to calculate rating averages of the item categories and to further obtain each predicted rating value of each item category.

In the other hand, the prediction session 2b obtains a predicted rating value with the rating logs of a target user through a rough-set prediction and a statistical analysis prediction, comprising the following steps:

(f) Building rating table 26: Other users related to a target user are found in the user clusters built in the training session for obtaining a rating table of items for the target user and the other users.

(g) Building sub-matrix 27: Based on the association rules built in the training session, unknown values of items other than that of a target item of the target user are predicted for building a complete sub-matrix.

(h) Obtaining predicted rating value through rough-set prediction 28: A class item, a referred item and a plurality of item sets are found from the sub-matrix by using a rough-set algorithm having a user cardinality constraint and an item cardinality constraint. A plurality of first elementary sets are obtained through dividing the users in the sub-matrix with the class item; and a plurality of second elementary sets are obtained through dividing the users in the sub-matrix by the item sets. Then, the first elementary sets and the second elementary sets are compared to obtain a lower approximation for further obtaining a predicted rating value of the target item of the target user.

(i) Obtaining predicted rating value through statistical analysis prediction 29: Predicted rating values of the item categories in the sub-matrix are obtained from the rating tables built through the statistical analysis prediction in the training session; and another predicted rating value of the target item is further obtained.

(j) Deciding predicted rating value 30: Based on the predicted rating value obtained through the statistical analysis prediction and that obtained through the rough-set algorithm, a final predicted rating value of the target item are obtained through a switch-based mixing by judging whether a second standard deviation of past rating values of the target item of each user is bigger than a first standard deviation or not, where the first standard deviation is pre-set as a threshold; and, if the second standard deviation is not bigger than the threshold, the predicted rating value obtained through the rough-set algorithm is outputted, or else, the predicted rating values obtained through the statistical analysis prediction is outputted. With the above steps, a novel recommendation method using rough-set and multiple features mining integrally is obtained.

Figure 3:
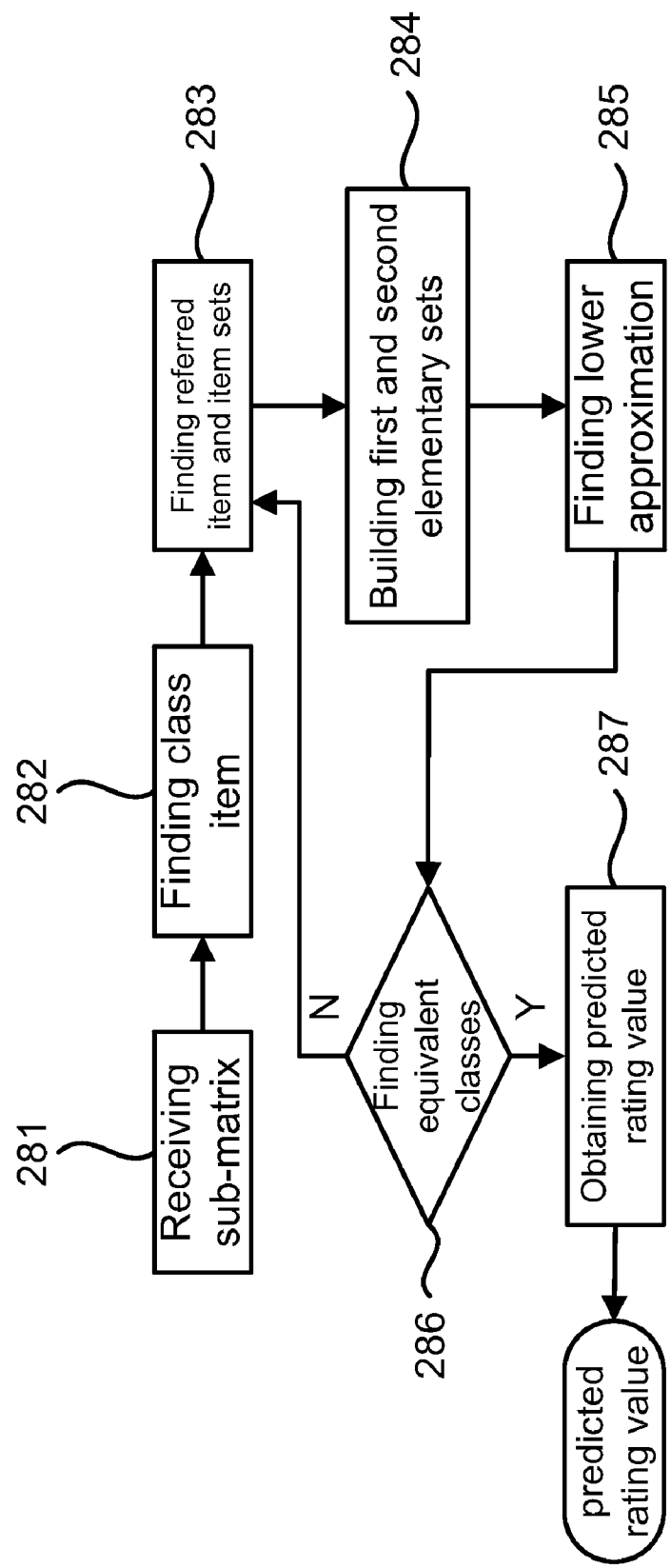
FIG. 3 is the flow view showing the rough-set algorithm.

Please further refer to FIG. 3, which is a flow view showing the rough-set algorithm. As shown in the figure, the rough-set algorithm in step (h) further comprises the following steps:

(h1) Receiving sub-matrix 281: The sub-matrix built in step (g) is received.

(h2) Finding class item 282: Similarities of items in the sub-matrix to the target item are calculated to obtain a class item having the highest similarity.

(h3) Finding referred item and item sets 283: Similarities of items in the sub-matrix to the target item other than the class item are calculated to find a referred item by setting an item cardinality constraint in the rough-set algorithm and to find a plurality of item sets most related to the target item through sorting.

(h4) Building first and second elementary sets 284: Based on the class item, the users found in rating logs are divided for forming a plurality of first elementary sets. Again, based on the item sets, the users other than the target user are divided with equivalent classes in rating logs for forming a plurality of second elementary sets.

(h5) Finding lower approximation 285: The first elementary sets and the second elementary sets are compared to find items completely included in both groups of sets as a lower approximation.

(h6) Finding equivalent classes 286: Related items are obtained if number of the related items in the lower approximation is not bigger than a user cardinality constraint set in the rough-set algorithm. Yet, if the number is not conforming, step (h3) is gone back to re-define most related item sets.

(h7) Obtaining predicted rating value 287: Based on the lower approximation, a predicted rating value of the target item of the target user is obtained since the rating value of the target item is similar to the rating values of the item sets.

Thus, in the method according to the present invention, association rules for a target user are effectively found through data mining in a transaction table formed by integrating user profiles, user rating logs and item contents. Behaviors of the target user are considered; and, problems of cold start, first rater and sparsity in collaborative filtering are solved as well. By using the method according to the present invention, most related association rules on users-to-items are found no matter for a new user or a new item; and rating values are further predicted. Hence, the sparsity problem is solved by analyzing the predicted rating values with association rules.

The following example finds a recommended movie through a training session and a prediction session:
Training Session:
[State of Use 1] Mining Association Rules With past rating logs of users, a transaction table integrating user profiles and movie contents is formed, where each user profile comprises an age, a sex, a profession, a code area of a user; and each movie content comprises a movie ID and a movie category of a movie.

Figure 4:
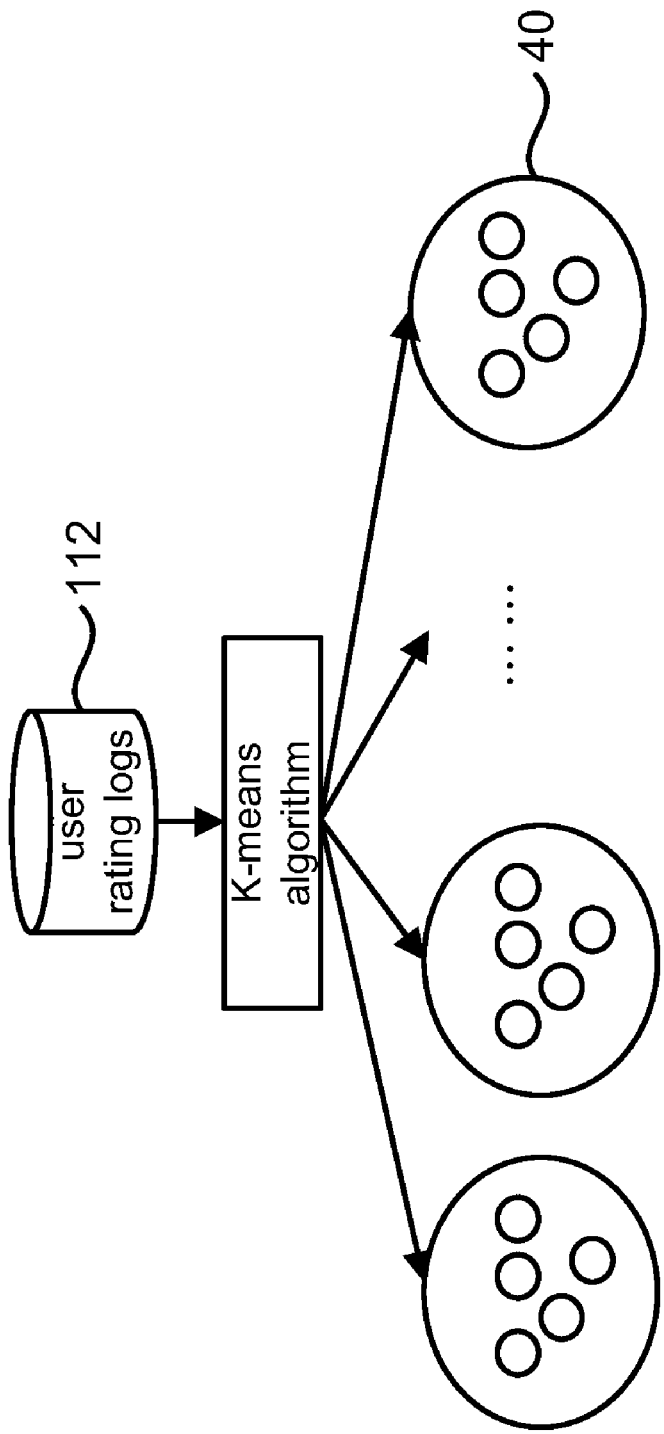
FIG. 4 is the flow view showing the clustering algorithm.

After pre-processing different data to form the transaction table through integrating the data, association rules having the same definitions are found through association mining.
[State of Use 2] Clustering Users Please further refer to FIG. 4, which is a flow view showing a clustering algorithm. As shown in the figure, a clustering algorithm of data mining is used to calculate similarities of items. A formula of a Pearson correlation coefficient is used to divide users in the user rating logs 103 into groups having similar rating behaviors. Thus, the users are divided into user clusters 4 in advance for greatly reducing area for finding similar users. Therein, the clustering algorithm is a K-means algorithm for dividing the users into K groups in a KNN way.
[State of Use 3] Building Rating Table of Model$_{SA}$ Please further refer to FIG. 5 to FIG. 8, which are a first view showing movie categories; a first view showing rating values of movies; a view showing virtual categories; and a view showing rating values of the virtual categories. As shown in the figures, concerning building a SAP module, since a movie can belong to multiple categories, the present invention re-symbolizes categories to build a rating table for the re-symbolized categories.

Figure 8:
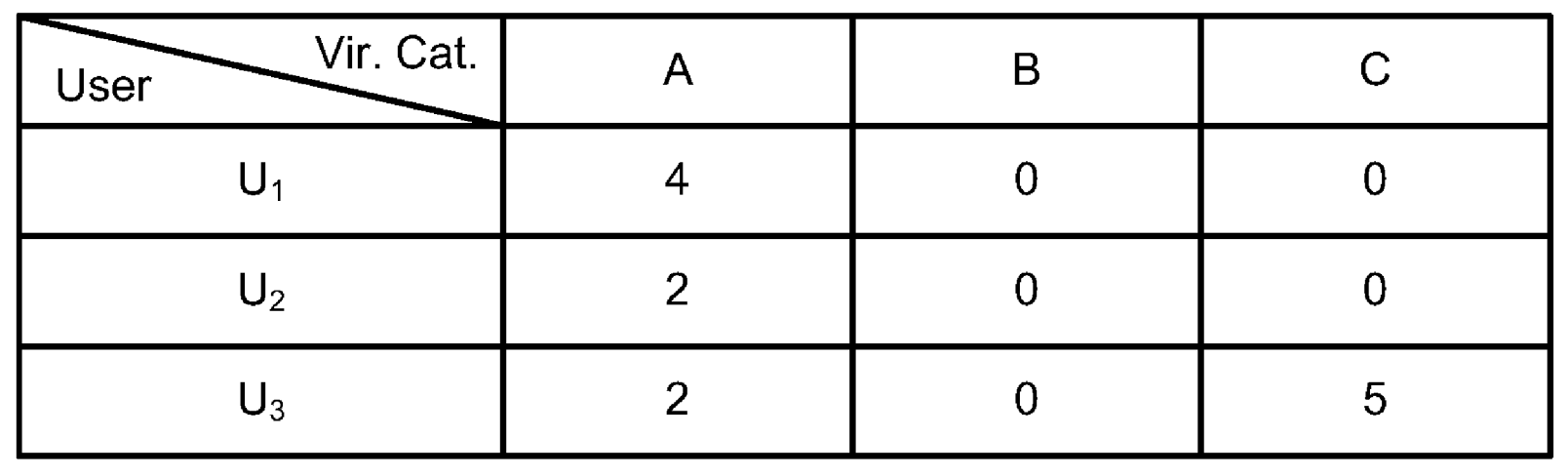

Take movies of $I_1$ to $I_4$ and categories of $C_1$ to $C_4$ as examples shown in FIG. 5. $I_1$ and $I_4$ both belong to the same categories of $C_1$, $C_3$ and $C_4$, so $I_1$ and $I_4$ belong to a re-symbolized virtual category $C_4$. Since $I_1$ and $I_4$ has rating values of 3 and 5 for the user $U_1$ in the rating table as shown in FIG. 6, while $I_1$ and $I_4$ belong to the same virtual category $C_4$ as shown in FIG. 7. A rating value of $C_4$ for $U_1$ is thus obtained by averaging rating values of $I_1$ and $I_4$ as shown in FIG. 8: (3+5)/2=4.
Prediction Session:
[State of Use 4] Building Rating Table with User Clusters Please further refer to FIG. 9a, which is a second view showing the rating values of the movies. As shown in the figure, similarities of rating logs of the target user to rating logs of centers of the user clusters 4 built in the training session are calculated through a distance formula with the Pearson correlation coefficient for finding user clusters 4 having shortest distance to the target user. Based on the other users in the user clusters 4 found through the distance formula, a rating table for the target user and the other related users are built to filter out unrelated users and to reduce data amount for further processes in a rough-set algorithm with a better scalability. In the rating table shown in FIG. 9a, '0' is a default value for any item; '1' is a value for a recommended item unselected; '2', a recommended item selected; '3', a recommended item selected and previewed; '4', a recommended item selected and watched; and '5', a recommended item selected and watched twice.
[State of Use 5] Building Complete Rating Table with Association Rules Suppose the following association rules are found in the training session:

{Young,M,Administrator,Action}→{3}
{Young,M,Action,Fantasy}→{4}
{Young,Administrator,Action,Fantasy}→{4}

The first association rule means a young male administrator gives an action movie a rating value of 3; the second association rule means a young male gives a fantasy movie a rating value of 4; and, the third association rule means a young administrator gives a fantasy action movie a rating value of 4. When a user profile fits the above description and a predicted item (a target item) fits the above description too, a rating value of the item is predicted as 3 or 4. Thus, a prediction is obtained through considering and summarizing the above rules as (3+4+4)/3=3.3≈3. In this way, problems of cold start, first rater and sparsity are effectively solved.

[State of Use 6] Predicting Rating Value of $Model_{RS}$

Please further refer to FIG. 9B to FIG. 11, which are a view showing the sub-matrix obtained through the association rules; and views showing first elementary sets and second elementary sets. As shown in the figures, the rating values for the users are predicted through the rough-set algorithm with a user cardinality constraint and an item cardinality constraint. The user cardinality constraint is used to limit a size of a lower approximation of equivalent classes both appeared in the first elementary sets and the second elementary sets. The item cardinality constraint is used to limit a size of the item sets on building the second elementary sets. Therein, the user cardinality constraint and the item cardinality constraint are both 2.

The association rules found in [State of use 5] are used to modify the rating table built in [State of use 4] for the target user and the other users, where unknown values of items other than that of the target item are predicted; and a complete sub-matrix is thus obtained from the rating table as shown in FIG. 9B. Then, a distance formula of Pearson correlation coefficient is used to calculate similarity of each item in the sub-matrix to the target item; and the distance formula is as follows:

$$\gamma = \frac{\sum XY - \frac{\sum X \sum Y}{N}}{\sqrt{\left(\sum X^2 - \frac{(\sum X)^2}{N_x}\right)\left(\sum Y^2 - \frac{(\sum Y)^2}{N_y}\right)}}.$$

Therein, X and Y are two matrixes and N is the number of data of the two matrixes.

With the distance formula, from the modified rating table, similarities of the other items to the target item are calculated, where the target item is $I_2$; and the other items are $I_1, I_3, I_4$ and $I_5$ with the similarities of 0.938, 0.1, −0.18, and −0.18, respectively. Among them, $I_1$ has the highest Pearson correlation coefficient to $I_2$, so $I_1$ is set as the class item. As shown in FIG. 10, according to the rating logs of the class item, the users are divided into first elementary sets. As shown in FIG. 11, $I_3$ is set as the referred item for having the second high similarity to the target item; and the users are divided into second elementary sets according to the rating logs of the referred item $I_3$ and the rating logs of the target item $I_2$. The first elementary sets and the second elementary sets are compared to find items both appeared in the first elementary sets and the second elementary. The elementary set in the second elementary sets having the same rating value of the referred item $I_3$ as that of the referred item $I_3$ of the target user is {elementary 5, elementary 7}. The user cardinality constraint is set as 2; and the lower approximation {elementary 5} is thus obtained. A predicted rating value of the target item, which is 4, is thus obtained as the same rating value to that of the item category based on the lower approximation.

[State of Use 7] Obtaining Predicted Rating Value of $Model_{SA}$

Please refer to FIG. 12, which is a second view showing movie categories. As shown in the figure, item $I_x$ has the same data as $I_1$ and $I_4$ (as shown in FIG. 5), so $I_x$ belongs to the same re-symbolized category $C_A$. Hence, the rating table of the re-symbolized categories built in the training session is used on predicting rating value of $I_x$ of $U_1$; and the predicted rating value is an average of the rating values of $I_1$ and $I_4$: (4+4)/2=4.

[State of Use 8] Obtaining Predicted Rating Value Through Deviation Decision

Based on the predicted rating value of $Model_{SA}$ obtained in [State of use 7] and the predicted rating value of $Model_{RS}$ obtained in [State of use 6], a switch-based mixing is used to effectively enhance satisfaction of the prediction precision.

First of all, rating behavior of each item category for each user is predicted with a first standard deviation of the predicted rating value of $Model_{SA}$, where the first standard deviation has a formula:

$$\alpha = \sqrt{\frac{1}{N} \sum_{i=1}^{N} (x_i - \bar{x})^2}.$$

Therein, N is number of the rating logs of the target item and $x_i$ is each rating value of the target item in the rating logs.

The switch-based mixing uses the first standard deviation as a threshold to judge whether a second standard deviation of past rating values of the target item for the target use is bigger than the threshold. If the standard deviation is bigger than the threshold, the predicted rating value of $Model_{RS}$ is obtained as a final predicted rating value; or else, the predicted rating value of $Model_{SA}$ is obtained as the final predicted rating value. Hence, the switch-based mixing is defined as the following:

$$FRSA_{swi} = \begin{cases} \text{Perform } Model_{RS}, & \alpha_i > \alpha_{threshold} \\ \text{Perform } Model_{SA}, & \text{otherwise.} \end{cases}$$

Therein, $Model_{RS}$ is the RSP module; $\alpha_i$ is the rating deviation of the target item obtained through the standard deviation; and $\alpha_{threshold}$ is the parameter of the RSP module.

To sum up, the present invention is a recommendation system using rough-set and multiple features mining integrally and a method thereof, where user data and item data are integrated to find association rules through data mining with problems of cold start, first rater and sparsity solved; a good data processing is achieved through filtering other unrelated users with a clustering algorithm; and a threshold is set to dynamically apply predictions obtained through two methods for effectively enhancing satisfaction of the prediction precision.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A recommendation method using rough-set and multiple features mining integrally, said method comprising a training session and a prediction session, said training session building association rules, user clusters and rating tables, said training session comprising steps of:
(a) providing data including user profiles, user rating logs and item contents;
(b) pre-processing said data to obtain a transaction table;
(c) associating transactions in said transaction table to obtain a plurality of associations to further obtain a plurality of association rules through data mining to be saved in an association rule database;

(d) obtaining said user rating logs to divide users in said user rating logs into user clusters through a clustering algorithm to be saved in a user cluster database; and (e) analyzing said transactions in said transaction table to re-symbolize items into item categories through a statistical analysis and reorganizing user rating logs to obtain rating averages of said item categories and to further obtain a rating table of said re-symbolized item categories, said prediction session applying rough-set and statistical analysis prediction to obtain predicted rating values from said user rating logs, said prediction session comprising steps of:

(f) finding a user cluster of related users to a target user from said user clusters to obtain a rating table of said related users and said target user;

(g) based on said association rules, predicting unknown values in said rating table other than rating value of a target item of said target user to obtain a complete sub-matrix;

(h) obtaining a class item, a referred item and a plurality of item sets in said sub-matrix, obtaining a plurality of first elementary sets by dividing said users with said class item, obtaining a plurality of second elementary sets by dividing said users with said item sets, and comparing said first elementary sets and said second elementary sets to obtain a lower approximation through a rough-set algorithm using a user cardinality constraint and an item cardinality constraint to further obtain a predicted rating value of said target item of said target user;

(i) obtaining predicted rating values of said item categories in said rating table obtained through said statistical analysis prediction in said training session to further obtain another predicted rating value of said target item of said target user; and (j) obtaining a final predicted rating value of said target item of said target user through a switch-based mixing, wherein a first standard deviation is pre-set as a threshold;

wherein said predicted rating value obtained through said statistical analysis prediction is obtained as said final predicted rating value of said target item on obtaining a second standard deviation bigger than said threshold, said second standard deviation being a standard deviation of past rating values of the same item category as that of said target item; and wherein said predicted rating value obtained through said rough-set algorithm is obtained as said final predicted rating value on obtaining said second standard deviation not bigger than said threshold.

2. The recommendation method according to claim 1,
wherein, in step (d), a Pearson correlation coefficient is used in said clustering algorithm to divide users into said user clusters based on similarities of said users to said target user.

3. The recommendation method according to claim 1,
wherein said clustering algorithm is a K-means algorithm.

4. The recommendation method according to claim 1,
wherein, in step (f), similarities of centers of said user clusters to said target user on rating logs are obtained through a distance formula of Pearson correlation coefficient to obtain a plurality of said user clusters having a nearest distance to said target user.

5. The recommendation method according to claim 1,
wherein, in step (g), a distance formula of Pearson correlation coefficient is used to obtain a similarity of each item in said sub-matrix to said target item and said distance formula is as follows:

$$\gamma = \frac{\sum XY - \frac{\sum X \sum Y}{N}}{\sqrt{\left(\sum X^2 - \frac{(\sum X)^2}{N_x}\right)\left(\sum Y^2 - \frac{(\sum Y)^2}{N_y}\right)}}.$$

6. The recommendation method according to claim 1,
wherein said user cardinality constraint is used to limit a size of said lower approximation.

7. The recommendation method according to claim 1,
wherein said item cardinality constraint is used to limit a number of said item sets on building said second elementary sets.

8. The recommendation method according to claim 1,
wherein step (h) further comprises steps of:
(h1) obtaining said sub-matrix built in step (g);
(h2) obtaining similarities of items in said sub-matrix to said target item and obtaining an item having the highest similarity as a class item;
(h3) obtaining similarities of items in said sub-matrix other than said class item to said target item to obtain a referred item by setting an item cardinality constraint in said rough-set algorithm and to obtain item sets most related to said target item through sorting;
(h4) based on said class item, dividing said users into user clusters to obtain a plurality of first elementary sets and, based on said item sets, dividing said users other than said target user having rating logs of equivalent class into user clusters to obtain a plurality of second elementary sets;
(h5) comparing said first elementary sets and said second elementary sets to obtain items completely included in both groups of sets as a lower approximation;
(h6) obtaining related items in the lower approximation by setting a user cardinality constraint in said rough-set algorithm,
wherein step (h3) is went back on number of said related items in the lower approximation bigger than said user cardinality constraint; and
(h7) based on said lower approximation, obtaining predicted rating value of said target item of said target user while rating value of said target item is similar to rating value of said item set.

9. The recommendation method according to claim 1,
wherein said standard deviation used in said switch-based mixing has a formula as follows:

$$\alpha = \sqrt{\frac{1}{N} \sum_{i=1}^{N} (x_i - \bar{x})^2}.$$

* * * * *